June 18, 1974      M. GRINGRAS      3,817,776
GRANULAR FREE-FLOWING MATERIAL FOR USE
IN THE MANUFACTURE OF GLASS
Filed Dec. 19, 1969      2 Sheets-Sheet 2
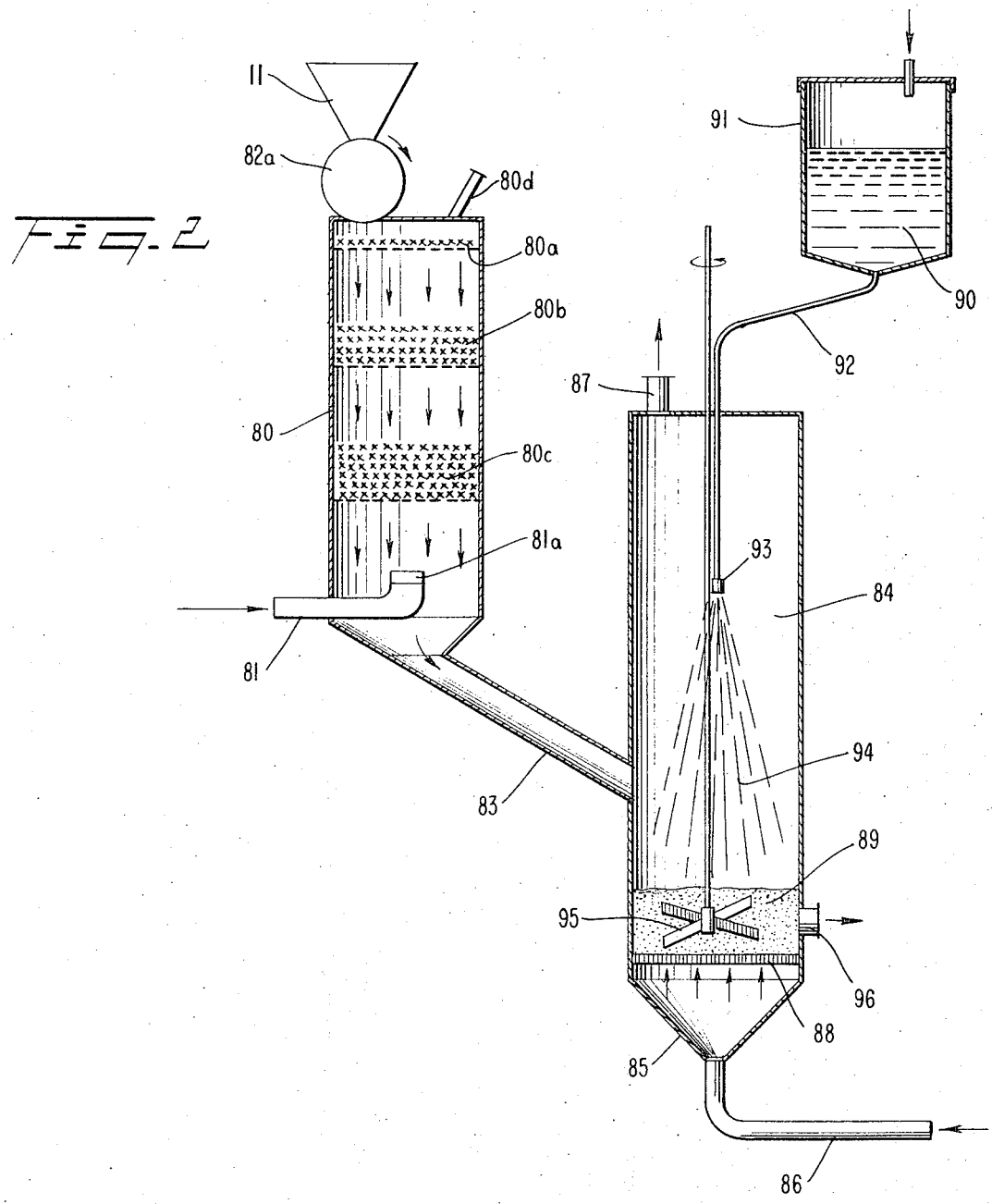
INVENTOR
MICHEL GRINGRAS United States Patent Office 3,817,776
Patented June 18, 1974

3,817,776
GRANULAR FREE-FLOWING MATERIAL FOR USE IN THE MANUFACTURE OF GLASS
Michel Gringras, Bonel, France, assignor to Compagnie de Saint-Gobain, Neuilly-sur-Seine, France
Continuation-in-part of application Ser. No. 601,907, Dec. 15, 1966, now Patent No. 3,503,790, dated Mar. 31, 1970. This application Dec. 19, 1969, Ser. No. 886,640
Claims priority, application France, Dec. 27, 1965, 43,817
The portion of the term of the patent subsequent to Mar. 31, 1987, has been disclaimed
Int. Cl. C03c 1/02
U.S. Cl. 117—100 S                     3 Claims

ABSTRACT OF THE DISCLOSURE

Granular free-flowing materials comprising grains of sand enrobed in a coating of anhydrous crystalline sodium metasilicate resulting from the heating between 320° and 450° C. of a mixture of silica grains and sodium hydroxide.

---

Figure 1:
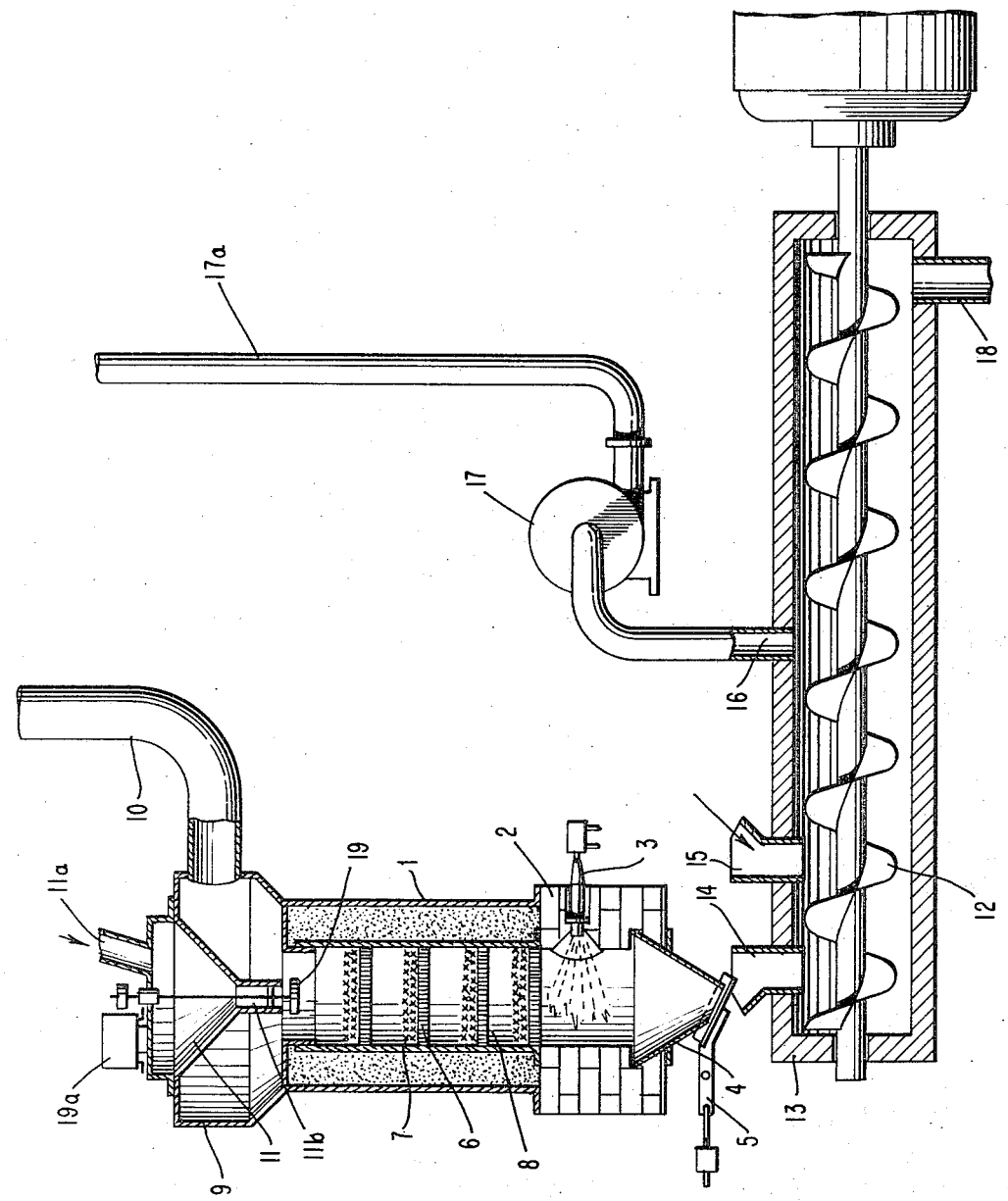

This application is a continuation-in-part, of application Ser. No. 601,907, filed Dec. 15, 1966 now Pat. No. 3,503,790, issued Mar. 31, 1970.

This invention relates to apparatus for the manufacture of novel products facilitating the production of glass, and to those products per se.

It is known that the manufacture of glass and certain other silicates may be thought of as the transformation of a heterogeneous granular mass of raw materials such as silica, calcium carbonate, dolomite, sodium carbonate, sodium sulfate, and feldspar, into a homogenous vitreous mass.

Different techniques have been used to accomplish the aforesaid vitrification, all of which involve heat, but the heat has been applied at different stages of manufacture and at different thermal levels. Eventually the heat fuses the mass. The homogeneity of the final product of silicate or molten glass is obtained the more completely and rapidly as the causes of heterogeneity are reduced or eliminated during successive meltings of the raw materials in the initial mixture. Among the causes of heterogeneity are, for example, the volatility of some raw materials, the segregation of others by reason of premature fusion, as in the case of sodium carbonate, or of certain compositions which are temporarily formed at the beginning of the fusion, as in the case of low silica silicates, or because of the appearance of low density materials which have a tendency to float, as in the case of certain allotropic types of quartz.

To reduce such difficulties it has been proposed to divide glass melting into steps. For example, in the case of the manufacture of soda-lime glass, which is much used in windows, it has been proposed to introduce the silica and sodium as prefabricated silicate. The use of such prefabricates in the manufacture of glass or other silicates is favorable to homogeneity and to an increased rate of fusion.

In the standard glass melting techniques in a tank-type furnace the temperature of the mass undergoing fusion at a given location in the furnace is never the ideal temperature for all the reactions which are simultaneously proceeding at the point. The present invention permits the use of the most favorable thermal conditions by the formation of novel preliminary products or intermediates which, when mixed and heated with the remaining elements of the glass or silicate composition, contribute improved homogeneity and frequently at a reduced expenditure of heat.

When the raw materials in the furnace, in the standard process, begin their transformations, chemical reactions occur which impose their individual characteristics of temperature, duration and the like upon the general fusion, which is usually called the melting. These chemical reactions come directly from exchanges of heat and exchanges of substance between the granular raw materials of the composition, and later between the different solid phases, or between the liquids resulting from partial fusion and the residual granular solids. It is an object of this invention to meet the requirements of rapid fusion, to carry out simultaneously the thermal exchanges and the exchanges of substance between the granular materials, that is to say, to bring the raw materials in contact with each other, grain by grain, under the thermal conditions best calculated to assure their mutual reaction.

This principle is used in the present invention to produce an intermediate product having a core of silica and a coat of sodium metasilicate which constitutes a preferred starting material for the manufacture of glass. In this practice it is desirable but not essential to include the totality of the silica and the soda, and when desired, certain other silicates and a supplement of alakli metal compounds, alkaline earth compounds, and magnesium.

Another object is to produce these new materials in granular form for the manufacture of silicates by ignition. The products chosen to illustrate the invention are grains of silica bearing complete or partial coats of sodium metasilicate. The grains thus contain unreacted silica bonded to a surface of sodium metasilicate. Because of the coat of sodium metasilicate these grains are particularly reactive and may be used in the manufacture of sodium silicate and other silicates such as soda-lime glass to improve them and their processes of manufacture. The silica used in this invention need not be pure $SiO_2$ but may be silica as it occurs in the raw materials of nature as used in the glassmaking industry, for example sand.

A further object of the invention is to provide apparatus which is of general utility in the efficient and rapid heating of materials, in particular sand, for use in the production of the novel materials as set forth in the immediately preceding paragraph.

Still another object is to provide apparatus as aforesaid which is extremely useful in bringing the heated sand into reactive intimate contact with other material or materials, such as caustic soda, to result in a granular product wherein each grain of sand is coated or enrobed in sodium metasilicate of substantial thickness and mass with respect to the mass of its core of unreacted silica.

Another object is to provide apparatus as aforesaid which, because of its efficient and rapid heating and mixing of reactive components, is capable of maximum mass/time rate of production for any given size of apparatus.

Other objects and advantages will become clear to those skilled in the art, after a study of the following detailed description.

The aforesaid objects are accomplished, generally speaking, by a raw material for the manufacture of glass and metal silicates consisting essentially of grains of unreacted silica at least a portion of the surface of which is composed of sodium metasilicate; and by apparatus adapted to the manufacture of silica coated with silicate which comprises tower means, means to drop grains down through the tower means, means to flow hot gases up through the tower means, means to provide the grains with periods of free fall interspersed with periods of slower downward motion, reaction chamber means connected to the tower means, means to supply the reaction chamber with other finely divided materials, and means to intermix the hot grains with such materials in the reaction chamber.

In the form of the invention chosen for illustration an intermediate consisting of silica coated with sodium metasilicate is produced at a temperature between about 320 and 450 C. from preheated silica sand and particulate caustic soda, the particles of which are of the same order as the sand. The caustic soda can be subdivided mechanically, physically, before or at the very moment of its contact with the silica.

In the apparatus selected for illustration, the heat necessary to produce the reaction is imparted to the sand and carried into the reaction by it, while the caustic soda is added at room temperature. Satisfactory results are achieved by preheating the sand to about 500° to 700° C. However, equally satisfactory results may be attained by preheating both the sand and the caustic soda to provide the heat necessary for reaction.

The reactor in which the reaction occurs may be heated or not depending to some extent upon its size and state of heat insulation. I have established the fact that the caustic will react with the grains of silica immediately at a temperature of 320° to 450° C. when they are in a comparable state of dispersion, that is to say, in particles of roughly the same size, producing a layer of sodium metasilicate which, in many cases practically covers the unreacted silica, and that the resulting particles do not tend to agglomerate. The product appears as a whitish fluid powder of high reactivity in its intended use.

In the apparatus selected for illustration wherein the sand only is preheated, the caustic soda may be added in the form of flakes, granules or globules. When the caustic soda also is preheated as aforesaid, it may advantageously be melted and dispersed in droplets in the reactor. It is also possible and practicable to add the caustic soda in the form of a spray of an aqueous solution, but in such case it is advisable to heat the reactor itself, the more readily and rapidly to eliminate the water by vaporization.

It is well known that sand reacts with caustic soda at about 300° C. to produce sodium metasilicate. But because of the low exothermic character of the reaction, it is necessary to apply heat to keep the reaction going. This input of the necessary heat can be accomplished by preheating the sand or by heating the reactor or both.

The temperature to which the sand is preheated should be chosen in the light of the form under which the caustic soda is found, as well as of its temperature: whether the caustic soda is solid at room temperature, is molten, or is in hot or cold solution, and whether the solution is of greater or less concentration.

According to another characteristic of the invention the preheating of the sand is carried out continuously.

According to another characteristic of the invention the sand is preheated continuously in a packed tower through which the sand makes its way by gravity countercurrent to the ascending hot gas from burners located in a fire pit at the base of the tower. I have established the fact that certain types of packing are particularly favorable, among other reasons because of the moderate temperatures employed and of the flow characteristics of the sand. The packing of the heating tower may advantageously be constituted by refractory elements of regular geometric shapes such as rings, pall rings, and other shapes which permit the sand to trickle downwardly through the interstices. Other examples are irregular shapes and large steel turnings. Ceramic materials are satisfactory for the packing. The packed towers are particularly advantageous for sand because they considerably reduce the size of the apparatus. While the packing rings can fill the whole tower, it is advantageous to distribute the packing in separated layers on perforated plates, grates or grilles. This provides progression in steps of alternate turbulent free fall and trickling motion. By extending the thickness of the packing in each or in certain layers, the duration of exposure of the sand to the hot gases may be increased, precisely producing sand at whatever temperature is most advantageous.

In the drawing:

FIG. 1 is a vertical section through a first form of apparatus for carrying out the invention, in which the entire heat necessary for the reaction is carried into the reaction chamber by the sand; and FIG. 2 shows a modified form wherein part of the heat is carried to the reaction by the sand, and part is supplied by heated air blown upwardly through, and also serving to agitate, the reactive mass.

The installation of FIG. 1 includes a tower 1 for preheating the sand, and a reactor 13 in which the reaction of the hot sand with solid caustic soda takes place. The preheating tower is composed of an insulated cylinder which rests on a masonry base 2 which constitutes a fire pit into which one or more burners 3 discharge. These burners are preferably arranged to discharge tangentially into the pit, thus creating a swirl effecting more rapid and efficient heating of the sand. The tower is provided with perforated plates or grilles 6 each of which carries a load of packing 7 made up of Raschig rings, pall rings, or the like. The tower may also include above the packed rings, one or more grids or grilles which are without packing and which act to break up any agglomerates or lumps of the raw material, as sometimes occurs when the humidity level in the material is so high as to prevent regular and free fall throughout the whole section of the tower.

Between the grilles 6 a free space 8 is provided to establish turbulence of the falling grains in the rising hot gases and the sand. Sand is supplied to the tower by a hopper 11 which receives it through orifice 11a and discharges it to the top of the tower through the orifice 11b, the opening of which is controlled by a valve 19 operated by a motor 19a. This valve prevents air from entering the tower and disturbing the pressure conditions existing in the cyclone 9. This cyclone encircles the hopper and reduces the velocity of the hot gas, permitting any ultra-fine particles carried in its ascending currents to drop out before the gas itself is evacuated through suction line 10. The suction may be established at any degree, or lack of it, which contributes to the efficient function of the apparatus. As stacks and aspirators for such purposes are well known, they will not be described.

The cold sand admitted at the top of the tower is distributed from wall to wall by the upper grilles and falls from grille to grille in alternate turbulent free fall and trickling motion through the packing, acquiring increased heat as it progresses downwardly. The hot sand falls through the fire pit 2, into the hopper 4 from which it can be discharged by pivoting the gate 5 which is opened from time to time to discharge sand through port 14 into reaction chamber 13. This chamber is provided with a screw conveyor 12, and with an orifice 15 for the admission of other reactants, for instance sodium hydroxide in flakes, and with a gas-escape flue 16 served by an aspirator pump 17 and stacks 17a.

The reaction chamber is a horizontal tube which is insulated against loss of heat. The reaction between the hot sand and the cold sodium hydroxide releases water vapor which is drawn off through the aspirator. Screw conveyor 12 also acts as an agitator to mingle the hot sand with the caustic soda flakes, which melt in contact with the sand and are distributed throughout it, wetting the grains and coating them with a film which reacts superficially with the silca, producing sodium metasilicate. This is a product characteristic of the invention which retains its own character and granulometry and is moved continuously toward a discharge orifice 18 by conveyor 12.

The product issuing from the reactor is discharged toward storager directly to the raw materials of a glass or silicate plant.

FIG. 2 shows a modification. Process-wise the installation uses an aqueous solution of caustic soda 90 which is kept in a reservoir 91 and supplied through a discharge tube 92 to a spray head 93 inside the reaction chamber 84. The spray covers the whole surface of the mass. Sand grains 89 which are derived from conduit 83, are agitated by rotor 95 and are kept in a fluidified condition by hot gas, for instance hot air, arriving through conduit 86 and conical base 85 of chamber 84. The hot air forces its way upwardly through grille 88 and is drawn off through aspirator port 87 after flowing upwardly through the reaction chamber.

The product of the reaction is similar to that described in connection with FIG. 1, and is drawn off through discharge port 96. The sand is received in a novel hot tower 80 through hopper 11 and rotary valve 82a of ordinary construction. The tower is packed in layers of increasing thickness, the top layer 80a being relatively thin and serving to achieve equal distribution rather than to retard the fall of the sand grains.

The next level 80b has a thicker layer of packing which materially increases the time required for the grains to trickle from the top of the packing, through the grille. The third layer 80c is of further increased thickness, which further increases the time required for the sand to pass through the packing. From this layer the sand passes through conduit 83 to the reaction chamber. The gases enter the tower through pipe 81 and are burned in burner 81a. A controlled aspirator like 80d, controls the flow of gases from pipe 86 through reaction chamber 84. Agitator 95 not only provides intimate intermixture of the reactants but also prevents the formation of agglomerates, and assists the discharge.

In this form of the invention, part of the heat necessary to the reaction is imported by the sand and the remainder is supplied by the hot air in the reactor. The total quantity of heat supplied will be made sufficient to vaporize the water in the caustic solution. The reaction in the fluidized zone takes place at about 350° C. and is very rapid.

This installation has operated satisfactorily with an aqueous solution containing 50 to 70% by weight of caustic soda. The temperature of the sand as it enters the reactor is about 650° C.; the temperature of the air admitted through pipe 86 is about 600° C. The heat exchanges in the fluidized bed are so rapid that there is an almost instantaneous evaporation of the water in the caustic soda, this evaporation being further favored by the great surface of exchange being offered by the sand grains. The spray cone 94 totally prevents the escape of fine particles.

EXAMPLE

This example applies to an installation of the type represented in FIG. 1.

The tower 1 was composed of a cylindrical shaft well insulated against heat loss, 25 cm. in diameter and 150 cm. high. The grilles 6 supporting the packing 7 were 25 cm. About the packings were pall rings of 25 x 25 mm. and they formed a bed 15 cm. thick on each grille, leaving a free space 8 of about 10 cm. The burner 3 was supplied by 9 m.$^3$ per hour of illuminating gas providing heat of 4000 kcal. The air was drawn in through the conduit 16 at 1000 m.$^3$ per hour. The sand, at a temperature of 25° C. and a granulometry of 150–400 microns, was introduced at the top of the tower at 180 kg. per hour. The sand was received at the bottom of the tower at 750° C. and was put periodically into the reactor, which also received 45 kg. per hour of caustic soda flakes at 20° C. These flakes contained 1.6% $Na_2CO_3$, 2.8–2.9% NaCl, 0.1% $Na_2SO_4$, 5 p.p.m. Al, 45 p.p.m. Fe, 60 p.p.m. Ca, and 30 p.p.m. $SiO_2$.

The reactor 13 was a U-shaped trough 29 cm. high, of a cylindrical radius of 12 cm., and a length of 140 cm.

The product was composed of sand grains coated with sodium metasilicate and they issued from the apparatus at about 450° C. The structure of the product was studied by X-ray diffraction according to the method of Debye and Scherrer under radiation of 1.5405 A. (radiation Cu-K$\alpha$). The results of this study are found in the following table:

TABLE

| Interreticular distance, $d$, A. | Intensity of the point, $I/I_0$ | $SiO_2$ quartz, $\alpha$ | Sodium metasilicate, $SiO_2$ $Na_2O$ |
|---|---|---|---|
| 4.26 | 35 | X | |
| 3.56 | 20 | | X |
| 3.34 | 100 | X | |
| 3.04 | 100 | | X |
| 2.57 | 48 | | X |
| 2.46 | 12 | X | |
| 2.40 | 64 | | X |
| 2.26 | 12 | X | |
| 2.24 | 6 | X | |
| 2.13 | 9 | X | |
| 1.98 | 6 | X | |
| 1.88 | 28 | | X |
| 1.81 | 17 | X | |
| 1.75 | 40 | | X |
| 1.67 | 7 | X | |
| 1.54 | 15 | X | |
| 1.45 | 3 | X | |
| 1.42 | 40 | | X |
| 1.38 | 7 | X | |
| 1.375 | 10 | X | |
| 1.372 | 9 | X | |
| 1.291 | 3 | X | |
| 1.256 | 5 | X | |

These results show that the product is exclusively composed of silica which has not reacted and sodium metasilicate, the product of reaction. The two materials are so interconnected in every grain that under the microscope one cannot distinguish the limits of separation between the region formed of unreacted silica and the region formed of sodium metasilicate.

The novel raw materials are used in glassmaking with astonishing savings in melting time and heat. In order to make a glass having the following composition in weight percent: $SiO_2$, 72; $Na_2O$, 14; CaO, 8; MgO, 4; $Al_2O_3$, 2; the following batch was prepared, in parts by weight:

| | |
|---|---|
| Sand-sodium metasilicate | 675 |
| Sand | 13 |
| Sodium sulfate | 6.6 |
| Limestone | 135 |
| Dolomite | 64 |
| Feldspar | 38 |
| Cullet | 200 |

The analysis of an average sample of the silica-sodium metasilicate showed that this product contained 83% $SiO_2$ and 17% $Na_2O$. 13 kg. of pure sand were added to bring the contents of silica and soda to those necessary to the operation.

It was an astonishing result of this invention that by replacing silica and sodium carbonate, which are customarily used in this composition, with sand-sodium metasilicate, the productivity of the furnace, its output per unit of time, was increased from 10 to 16%, and the temperature in the interior of the furnace was substantially lowered with a substantial saving of heat and reduction of wear on the furnace. Reductions of temperature of 100° C. to 200° C. have been achieved.

The same apparatus is used to make polysilicates by fusing the appropriate ingredients. It should be understood that only the grains of sand-metasilicate are melted in the furnace, with or without the addition of pure sand when it is necessary to adjust the contents of silica and soda in the sodium polysilicate constituting the product. In this case also there is an astonishing increase in the productivity of the furnace, which has been increased from 30 to 60% while the temperature within the furnace has been lowered from 200° to 100° C. depending upon what product is being prepared. Similar reductions in temperature have been achieved in glassmaking.

The following novel concepts are found in this application:

A novel industrial product which facilitates the manufacture of glass and other silicates;

Apparatus for carrying out the manufacture of the new products by a procedure in which both reactants are in solid state, in which one reactant is solid and one molten, and in which one is solid and one in solution;

Apparatus for producing the novel product by intermixture on a support and by intermixture and reaction in the air;

Apparatus employing fluidification to facilitate the reaction;

Determination of preferred operating conditions for all types of processes;

Appartaus for preheating the sand and for controlling its flow while it is being heated;

Apparatus which controls the supply of raw materials automatically;

Apparatus for supplying caustic soda in the solid state, and in solution; and

Control of the temperature within the heating and reaction chambers.

In the prior art such as in British Pats. 943,488 and 1,044,204, there is disclosed foundry sand prepared by the simple immersion of sand grains in an aqueous solution of caustic soda and sodium silicate. The grains are thus covered or enrobed in a very thin regular layer of sodium metasilicate, after evaporation of the water.

It is clear that in the procedure disclosed in the aforesaid prior art, the totality of sodium metasilicate covering the sand grains, is not more than 1 to 2% of the total weight of the sand, for any given quantity of the completed product.

To the contrary, in the product produced by the apparatus and procedure herein disclosed, the sand grains are contacted by the caustic soda under a high degree of heat, the sand in all cases being preheated. The reaction thus created is of appreciable time duration and effects a penetration of the sand grains by the sodium metasilicate to a very material depth. In contrast to the 1 to 2% by weight of the metasilicate in the prior art, the weight of the sodium metasilicate formed by the present invention may be as great as 50% of each sand grain. Further, the ratio $SiO_2/Na_2O$ in each grain of the completed product may be positively controlled between about 2 and 6, by correspondingly controlling the period of reaction. The product resulting from the apparatus and procedure of the present invention is therefore vitally different from that produced by the aforesaid prior art because, as previously described herein, the large ratio of $Na_2O$ to $SiO_2$ affords a product which effects large savings in heat in glass melting and makes it possible to materially increase the time-rate of output for a furnace of any given or rated capacity, because of the shorter melting time required. It also promotes longevity in the furnace itself because of the lower temperatures required for melting.

It is also important to note that the prior art product contains "bound water," e.g., it is a hydrate whereas the product of the present invention is anhydrous. In short, the prior art product would clearly be devoid of any appreciable utility in the manufacture of glass and other silicates, because the very low ratio $SiO_2/Na_2O$ of .01 to .02 would afford none of the advantages inherent in the product of the present invention.

The apparatus herein disclosed is of particular utility in the preheating of granular materials such as sand, because of its high operating efficiency. For instance, in a tower having a total height of 2 m. and an interior diameter of 60 cm., that is to say, an apparatus of relatively small size, it is possible to heat sand from about 20 to about 850° C. at the rate of 1.2 to 1.4 metric tons per hour, that is, at the rate of about 30 metric tons per day, with a thermal efficiency of 80 to 85%.

The foregoing disclosure is to be taken in an illustrative rather than a limiting sense, for numerous equivalent substitutions and rearrangements of part will become obvious to those skilled in the art, after a study of the application.

Having fully disclosed the invention, what I claim and desire to secure by Letters Patent is:

1. A granular free-flowing material for use as a raw batch ingredient in a melting furnace for the manufacture of glass, constituted essentially of grains each having a core of unreacted silica enrobed in a coating of anhydrous crystalline sodium metasilicate resulting from the reaction under heating to between 320° and 450° C. of a mixture of silica grains and sodium hydroxide, said granular material having a ratio $SiO_2/Na_2O$ of between 2 and 6.

2. The material of claim 1, said reaction under heating being carried out at about 350° C.

3. A granular free-flowing raw batch material for introducing $Na_2O$ and $SiO_2$ in a melting furnace for the manufacture of glass, constituted of grains each having a core of essentially pure silica enrobed with anhydrous crystalline sodium metasilicate integrally united with said core by a reaction between the silica core and the sodium metasilicate under heating to between 320° and 450° C., the interface between said core and the sodium metasilicate enrobement being indistinguishable under microscopic magnification said granular material having a ratio of $SiO_2/Na_2O$ of between 2 and 6.

References Cited

UNITED STATES PATENTS

| | | | |
|---|---|---|---|
| 1,861,711 | 6/1932 | Moreton | 23—182 X |
| 2,743,196 | 4/1956 | Robinson | 117—118 X |
| 2,832,473 | 4/1958 | Oberholtzer | 117—100 X |
| 2,955,336 | 10/1960 | Horn et al. | 117—100 X |
| 3,074,802 | 1/1963 | Alexander et al. | 117—100 X |
| 3,208,822 | 9/1965 | Baker et al. | 117—100 X |
| 3,356,449 | 12/1967 | Shoaff | 23—182 |
| 3,503,790 | 3/1970 | Gringras | 117—100 X |

FOREIGN PATENTS

| | | | |
|---|---|---|---|
| 192,589 | 11/1906 | Germany | 117—100 X |
| 943,488 | 12/1963 | Great Britain | 117—100 |
| 1,044,204 | 9/1966 | Great Britain | 117—100 |

WILLIAM D. MARTIN, Primary Examiner

D. C. KONOPACK, Assistant Examiner

U.S. Cl. X.R.

117—118, 123 A, 169 A